United States Patent
Luke et al.

(10) Patent No.: US 10,819,145 B2
(45) Date of Patent: *Oct. 27, 2020

(54) APPARATUS, METHOD AND ARTICLE FOR AUTHENTICATION, SECURITY AND CONTROL OF POWER STORAGE DEVICES, SUCH AS BATTERIES, BASED ON USER PROFILES

(71) Applicant: Gogoro Inc., Hong Kong (CN)

(72) Inventors: Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,720

(22) Filed: Aug. 20, 2018

(65) Prior Publication Data

US 2019/0213809 A1 Jul. 11, 2019

Related U.S. Application Data

(63) Continuation of application No. 13/559,010, filed on Jul. 26, 2012, now Pat. No. 10,055,911.

(Continued)

(51) Int. Cl.
*H02J 11/00* (2006.01)
*H02J 7/00* (2006.01)
(Continued)

(52) U.S. Cl.
CPC .............. *H02J 11/00* (2013.01); *B60L 1/00* (2013.01); *B60L 1/003* (2013.01); *B60L 1/02* (2013.01);
(Continued)

(58) Field of Classification Search
CPC .... G07C 5/0858; G07C 9/00309; G07C 5/00; G07C 2009/00769; G06F 3/0608; G06F 3/0671; G06F 3/0638; G07F 17/12; G07F 17/0042; G07F 15/006; G07F 15/005; G07F 15/003; G01C 21/3682; G01C 21/3476;
(Continued)

(56) References Cited

U.S. PATENT DOCUMENTS 5,187,423 A * 2/1993 Marton .................... B60K 1/04
320/109
5,508,597 A * 4/1996 Parmley, Sr. ............. B60S 5/06
320/109

(Continued)

*Primary Examiner* — Nha T Nguyen
(74) *Attorney, Agent, or Firm* — Perkins Coie LLP

(57) ABSTRACT

A network of collection, charging and distribution machines collect, charge and distribute portable electrical energy storage devices (e.g., batteries, supercapacitors or ultracapacitors). To charge, the machines employ electrical current from an external source, such as the electrical grid or an electrical service of an installation location. The charging and distribution machines may distribute portable electrical energy storage devices of particular performance characteristics and other attributes based on customer preferences and/or customer profiles. The charging and distribution machines may provide instructions to or otherwise program portable electrical energy storage devices stored within the charging and distribution machines to perform at various levels according to user preferences and user profiles.

27 Claims, 9 Drawing Sheets

Related U.S. Application Data

(60) Provisional application No. 61/647,941, filed on May 16, 2012, provisional application No. 61/647,936, filed on May 16, 2012, provisional application No. 61/601,953, filed on Feb. 22, 2012, provisional application No. 61/601,949, filed on Feb. 22, 2012, provisional application No. 61/601,404, filed on Feb. 21, 2012, provisional application No. 61/581,566, filed on Dec. 29, 2011, provisional application No. 61/557,170, filed on Nov. 8, 2011, provisional application No. 61/534,772, filed on Sep. 14, 2011, provisional application No. 61/534,761, filed on Sep. 14, 2011, provisional application No. 61/534,753, filed on Sep. 14, 2011, provisional application No. 61/511,900, filed on Jul. 26, 2011, provisional application No. 61/511,887, filed on Jul. 26, 2011, provisional application No. 61/511,880, filed on Jul. 26, 2011.

(51) Int. Cl.

| | | |
|---|---|---|
| *H01M 10/42* | (2006.01) | |
| *H01M 10/44* | (2006.01) | |
| *H01M 10/48* | (2006.01) | |
| *B60L 15/20* | (2006.01) | |
| *B60L 3/00* | (2019.01) | |
| *B60L 7/06* | (2006.01) | |
| *B60L 7/14* | (2006.01) | |
| *B60L 7/22* | (2006.01) | |
| *B60L 53/14* | (2019.01) | |
| *B60L 50/40* | (2019.01) | |
| *B60L 50/51* | (2019.01) | |
| *B60L 53/80* | (2019.01) | |
| *B60L 55/00* | (2019.01) | |
| *B60L 53/65* | (2019.01) | |
| *B60L 53/66* | (2019.01) | |
| *B60L 53/10* | (2019.01) | |
| *B60L 58/10* | (2019.01) | |
| *B60L 58/16* | (2019.01) | |
| *B60L 58/21* | (2019.01) | |
| *B60L 58/26* | (2019.01) | |
| *B60L 50/60* | (2019.01) | |
| *B60L 50/64* | (2019.01) | |
| *B60L 53/30* | (2019.01) | |
| *B60L 53/68* | (2019.01) | |
| *G07C 5/08* | (2006.01) | |
| *B60L 1/00* | (2006.01) | |
| *B60L 1/02* | (2006.01) | |
| *B60L 1/14* | (2006.01) | |
| *E05B 81/56* | (2014.01) | |
| *G06F 3/06* | (2006.01) | |
| *G07C 5/00* | (2006.01) | |
| *G01C 21/34* | (2006.01) | |
| *G06Q 30/02* | (2012.01) | |
| *H02J 4/00* | (2006.01) | |
| *G06Q 10/02* | (2012.01) | |
| *E05B 47/00* | (2006.01) | |
| *E05B 81/04* | (2014.01) | |
| *G05B 19/05* | (2006.01) | |
| *B60R 25/04* | (2013.01) | |
| *G07C 9/00* | (2020.01) | |
| *B60L 3/12* | (2006.01) | |
| *G05F 1/66* | (2006.01) | |
| *G06Q 30/06* | (2012.01) | |
| *G01C 21/36* | (2006.01) | |
| *G07F 15/00* | (2006.01) | |
| *G07F 17/00* | (2006.01) | |
| *G07F 17/12* | (2006.01) | |

(52) U.S. Cl.
CPC ............... *B60L 1/14* (2013.01); *B60L 3/003* (2013.01); *B60L 3/0046* (2013.01); *B60L 3/0061* (2013.01); *B60L 3/0069* (2013.01); *B60L 3/12* (2013.01); *B60L 7/06* (2013.01); *B60L 7/14* (2013.01); *B60L 7/22* (2013.01); *B60L 15/2045* (2013.01); *B60L 50/40* (2019.02); *B60L 50/51* (2019.02); *B60L 50/60* (2019.02); *B60L 50/64* (2019.02); *B60L 50/66* (2019.02); *B60L 53/11* (2019.02); *B60L 53/14* (2019.02); *B60L 53/305* (2019.02); *B60L 53/65* (2019.02); *B60L 53/665* (2019.02); *B60L 53/68* (2019.02); *B60L 53/80* (2019.02); *B60L 55/00* (2019.02); *B60L 58/10* (2019.02); *B60L 58/16* (2019.02); *B60L 58/21* (2019.02); *B60L 58/26* (2019.02); *B60R 25/04* (2013.01); *E05B 47/0001* (2013.01); *E05B 81/04* (2013.01); *E05B 81/56* (2013.01); *G01C 21/3476* (2013.01); *G01C 21/3682* (2013.01); *G05B 19/05* (2013.01); *G05F 1/66* (2013.01); *G06F 3/0608* (2013.01); *G06F 3/0638* (2013.01); *G06F 3/0671* (2013.01); *G06Q 10/02* (2013.01); *G06Q 30/0253* (2013.01); *G06Q 30/0259* (2013.01); *G06Q 30/0261* (2013.01); *G06Q 30/0267* (2013.01); *G06Q 30/0639* (2013.01); *G07C 5/00* (2013.01); *G07C 5/0858* (2013.01); *G07C 9/00309* (2013.01); *G07F 15/003* (2013.01); *G07F 15/005* (2013.01); *G07F 15/006* (2013.01); *G07F 17/0042* (2013.01); *G07F 17/12* (2013.01); *H01M 10/425* (2013.01); *H01M 10/4257* (2013.01); *H01M 10/441* (2013.01); *H01M 10/482* (2013.01); *H02J 4/00* (2013.01); *H02J 7/00* (2013.01); *H02J 7/007* (2013.01); *H02J 7/0013* (2013.01); *H02J 7/0021* (2013.01); *H02J 7/0027* (2013.01); *H02J 7/0029* (2013.01); *B60L 2200/12* (2013.01); *B60L 2200/24* (2013.01); *B60L 2210/12* (2013.01); *B60L 2210/14* (2013.01); *B60L 2210/30* (2013.01); *B60L 2220/14* (2013.01); *B60L 2220/16* (2013.01); *B60L 2220/46* (2013.01); *B60L 2240/12* (2013.01); *B60L 2240/14* (2013.01); *B60L 2240/26* (2013.01); *B60L 2240/421* (2013.01); *B60L 2240/423* (2013.01); *B60L 2240/427* (2013.01); *B60L 2240/429* (2013.01); *B60L 2240/525* (2013.01); *B60L 2240/545* (2013.01); *B60L 2240/622* (2013.01); *B60L 2240/642* (2013.01); *B60L 2240/645* (2013.01); *B60L 2240/662* (2013.01); *B60L 2240/70* (2013.01); *B60L 2250/10* (2013.01); *B60L 2250/16* (2013.01); *B60L 2250/18* (2013.01); *B60L 2250/20* (2013.01); *B60L 2250/22* (2013.01); *B60L 2260/44* (2013.01); *B60L 2260/52* (2013.01); *B60L 2270/34* (2013.01); *B60L 2270/46* (2013.01); *G05B 2219/15048* (2013.01); *G05B 2219/15053* (2013.01); *G07C 2009/00769* (2013.01); *H01M 2010/4271* (2013.01); *H01M 2010/4278* (2013.01); *H01M 2220/20* (2013.01); *H01M 2220/30* (2013.01); *H02J 7/00036* (2020.01); *H02J 7/00045* (2020.01); *H02J 7/0045* (2013.01); *Y02E 60/12* (2013.01); *Y02E*

60/721 (2013.01); *Y02T 10/645* (2013.01); *Y02T 10/705* (2013.01); *Y02T 10/7005* (2013.01); *Y02T 10/7011* (2013.01); *Y02T 10/7022* (2013.01); *Y02T 10/7044* (2013.01); *Y02T 10/7055* (2013.01); *Y02T 10/7072* (2013.01); *Y02T 10/7088* (2013.01); *Y02T 10/7094* (2013.01); *Y02T 10/7225* (2013.01); *Y02T 10/7233* (2013.01); *Y02T 10/7241* (2013.01); *Y02T 10/7258* (2013.01); *Y02T 10/7283* (2013.01); *Y02T 10/7291* (2013.01); *Y02T 10/92* (2013.01); *Y02T 90/121* (2013.01); *Y02T 90/124* (2013.01); *Y02T 90/127* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01); *Y04S 50/10* (2013.01); *Y04S 50/14* (2013.01); *Y10T 70/7062* (2015.04); *Y10T 307/406* (2015.04)

(58) Field of Classification Search
CPC .......... G06Q 30/0639; G06Q 30/0253; G06Q 10/02; G06Q 30/0267; G06Q 30/0259; G06Q 30/0261; G05F 1/66; B60L 3/12; B60L 1/14; B60L 1/02; B60L 1/003; B60L 53/68; B60L 53/305; B60L 50/64; B60L 50/66; B60L 58/26; B60L 58/21; B60L 58/12; B60L 58/16; B60L 58/10; B60L 53/11; B60L 53/665; B60L 53/65; B60L 55/00; B60L 53/30; B60L 53/80; B60L 50/51; B60L 50/40; B60L 53/14; B60L 50/50; B60L 3/0069; B60L 3/003; B60L 2270/34; B60L 1/00; B60L 7/22; B60L 7/14; B60L 7/06; B60L 3/0061; B60L 3/0046; B60L 15/2045; B60L 2250/20; B60L 2250/18; B60L 2250/16; B60L 2250/10; B60L 2240/645; B60L 2240/642; B60L 2240/423; B60L 2240/421; B60L 2240/26; B60L 2240/12; B60L 2220/14; B60L 2270/46; B60L 2260/52; B60L 2260/44; B60L 2240/662; B60L 2240/622; B60L 2240/545; B60L 2240/525; B60L 2240/429; B60L 2240/427; B60L 2240/14; B60L 2220/46; B60L 2220/16; B60L 2200/24; B60L 2250/22; B60L 2240/70; B60L 2210/30; B60L 2210/14; B60L 2210/12; B60L 2200/12; B60R 25/04; G05B 19/05; G05B 2219/15053; G05B 2219/15048; H01M 10/482; H01M 10/441; H01M 10/425; H01M 10/4257; H01M 2010/4271; H01M 2220/30; H01M 2010/4278; H01M 2220/20; H02J 7/0013; H02J 7/007; H02J 4/00; H02J 7/00; H02J 7/0027; H02J 7/0021; H02J 2007/0098; H02J 2007/0001; H02J 11/00; Y04S 50/14; Y04S 30/14; Y04S 50/10; Y04S 10/126; Y04S 30/12; Y02T 90/161; Y02T 10/7291; Y02T 10/645; Y02T 10/7283; Y02T 90/162; Y02T 10/7088; Y02T 90/16; Y02T 10/7022; Y02T 10/7005; Y02T 10/7011; Y02T 90/168; Y02T 90/127; Y02T 90/128; Y02T 90/14; Y02T 90/124; Y02T 90/169; Y02T 90/163; Y02T 10/7225; Y02T 10/7233; Y02T 10/7241; Y02T 10/705; Y02T 10/7044; Y02T 10/7072; Y02T 10/7258; Y02T 10/92; Y02T 10/7055; Y02T 90/121; Y02T 10/7094; Y10T 70/7062; Y10T 307/406; Y02E 60/721; Y02E 60/12; E05B 81/04; E05B 47/0001; E05B 81/56
See application file for complete search history.

(56) References Cited

U.S. PATENT DOCUMENTS

| | | | | |
|---|---|---|---|---|
| 5,631,536 | A * | 5/1997 | Tseng | B60L 53/305 320/137 |
| 5,711,648 | A * | 1/1998 | Hammerslag | B60K 1/04 414/800 |
| 5,744,933 | A * | 4/1998 | Inoue | G06Q 20/127 320/110 |
| 5,927,938 | A * | 7/1999 | Hammerslag | B60K 1/04 414/809 |
| 5,951,229 | A * | 9/1999 | Hammerslag | B60K 1/04 414/398 |
| 6,094,028 | A * | 7/2000 | Gu | H01M 10/441 104/34 |
| 7,520,355 | B2 * | 4/2009 | Chaney | B60K 1/04 180/68.5 |
| 7,948,207 | B2 * | 5/2011 | Scheucher | B60L 53/305 320/104 |
| 8,820,444 | B2 * | 9/2014 | Nguyen | B60S 5/06 180/65.1 |
| 8,904,198 | B1 * | 12/2014 | Pinto | G07F 15/006 455/572 |
| 2008/0294283 | A1 * | 11/2008 | Ligrano | B60S 5/06 700/218 |
| 2009/0198372 | A1 * | 8/2009 | Hammerslag | B60L 53/305 700/226 |
| 2010/0071979 | A1 * | 3/2010 | Heichal | B60S 5/06 180/68.5 |
| 2010/0228405 | A1 * | 9/2010 | Morgal | B62H 3/02 701/2 |
| 2010/0230188 | A1 * | 9/2010 | Nguyen | B60S 5/06 180/65.1 |

* cited by examiner

```
                                                                    ┌─ 702
┌──────────────────────────────────────────────────────────────────────┐
│ select a portable electrical energy storage device with higher performance characteristics │
│   than another portable electrical energy storage device in the portable electrical energy │
│   storage device collection, charging and distribution machine that would be selected for  │
│  another user associated with another user profile that indicates a lower subscription level │
│        for use of the portable electrical energy storage device collection, charging and    │
│                                     distribution machine                                    │
└──────────────────────────────────────────────────────────────────────┘
```

FIG. 7

```
                                                                    ┌─ 802
┌──────────────────────────────────────────────────────────────────────┐
│   determine a driving profile of a diver by receiving information regarding the driving   │
│    profile based on one or more of: accelerator readings of the driver which correlate to  │
│ instances of high acceleration, and levels of current draw during a use of the driver of a │
│                          portable electrical energy storage device                         │
└──────────────────────────────────────────────────────────────────────┘
```

FIG. 8

900

902 receive a signal indicative that a used portable electrical energy storage device has been received by the portable electrical energy storage device collection, charging and distribution machine from the user before releasing the portable electrical energy storage device

FIG. 9

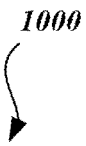

1000

1002 determine, based on the received user profile, a particular level of energy to release from the portable electrical energy storage device for use by the user

1004 configure a security system of the portable electrical energy storage device to release energy from the portable electrical energy storage device at the determined particular level for use by the user based on the received user profile

FIG. 10

APPARATUS, METHOD AND ARTICLE FOR AUTHENTICATION, SECURITY AND CONTROL OF POWER STORAGE DEVICES, SUCH AS BATTERIES, BASED ON USER PROFILES

CROSS REFERENCE TO RELATED APPLICATIONS

This application is a continuation of U.S. patent application Ser. No. 13/559,010, filed Jul. 26, 2012, now U.S. Pat. No. 10,055,911, which claims the benefit under 35 U.S.C. 119(e) of the filing date of U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012.

BACKGROUND

Technical Field

The present disclosure generally relates to the charging, selection and energy release from rechargeable electrical power storage devices (e.g., secondary batteries, supercapacitors or ultracapacitors), which may be suitable for use in a variety of fields or applications, for instance transportation and non-transportation uses.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped with a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches or approaches the end of its stored charge, an end user may simply replace, exchange or otherwise swap batteries or other electrical power storage devices. This may address issues related to cost, as well as limited range and relatively long recharging times.

As previously noted, secondary batteries and other electrical power storage devices are relatively expensive. Thus, it is beneficial to stock the least number of electrical power storage devices possible, while still ensuring that demand for such is satisfied.

For these reasons, the ability to have electrical power storage devices available according to particular user needs and preferences is important to commercial success of any such endeavor.

A method of operating a controller of a portable electrical energy storage device collection, charging and distribution machine may be summarized as including receiving, by the controller of the portable electrical energy storage device collection, charging and distribution machine, a request for a portable electrical energy storage device from a user at a portable electrical energy storage device collection, charging and distribution machine; automatically selecting, by the controller of the portable electrical energy storage device collection, charging and distribution machine, a portable electrical energy storage device in the portable electrical energy storage device collection, charging and distribution machine having particular performance characteristics, the selection based on a received user profile of the user; and automatically releasing the selected portable electrical energy storage device for the user.

The automatically selecting may include selecting a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine. The performance characteristics may include one or more of: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has experienced to date, number or frequency of deep discharges of the portable electrical energy storage device, temperature exposure of the portable electrical energy storage device, a value that represents number or frequency of charge cycles of the portable electrical energy storage device, whether the portable electrical energy storage device has been used by drivers with aggressive driving profiles.

The method of operating a controller of a portable electrical energy storage device collection, charging and distribution machine may further include determining, by the configured controller of the portable electrical energy storage device collection, charging and distribution machine, a driving profile of a driver by receiving information regarding the driving profile based on one or more of: accelerator readings of the driver which correlate to instances of high acceleration, and levels of current draw during a use of the driver of a portable electrical energy storage device.

The method of operating a controller of a portable electrical energy storage device collection, charging and distribution machine may further include receiving a signal indicative that a used portable electrical energy storage device has been received by the portable electrical energy storage device collection, charging and distribution machine from the user before releasing the portable electrical energy storage device.

The method of operating a controller of a portable electrical energy storage device collection, charging and distribution machine may further include determining, by the controller of the portable electrical energy storage device collection, charging and distribution machine, based on the received user profile, a particular level of energy to release from the portable electrical energy storage device for use by the user; and configuring, by the controller of the portable electrical energy storage device collection, charging and distribution machine, a security system of the portable electrical energy storage device to release energy from the portable electrical energy storage device at the determined particular level for use by the user based on the received user profile.

The configuring may occur before the releasing of the portable electrical energy storage device.

The method of operating a controller of a portable electrical energy storage device collection, charging and distribution machine may further include receiving the user profile over a wireless connection.

The receiving the user profile may include receiving the user profile via a mobile device of the user. The automatically selecting the portable electrical energy storage device may include selecting the portable electrical energy storage device based on past route information indicative of a number of aspects of a number of past routes taken by the user as indicated on the user profile. The automatically selecting the portable electrical energy storage device may include selecting the portable electrical energy storage device based on one or more vehicle specifications as indicated on the user profile. The automatically selecting the portable electrical energy storage device may include selecting the portable electrical energy storage device based on a prioritization system between users that is configured to compare the received user profile to other user profiles.

A portable electrical energy storage device collection, charging and distribution machine may be summarized as including a portable electrical energy storage device charger; a portable electrical energy storage device releasing system; a security system coupled to the releasing system; a user interface; and a controller coupled to the portable electrical energy storage device charger, the releasing system, the user interface and the security system, the controller including: at least one processor; at least one communications module coupled to the at least one processor, wherein the at least one processor is configured to: select for a user a portable electrical energy storage device having particular performance characteristics, the selection based on a received user profile of the user; and automatically release the selected portable electrical energy storage device for use by the user.

The at least one processor may be coupled to receive a request for a portable electrical energy storage device from the user at the portable electrical energy storage device collection, charging and distribution machine. The selection of the portable electrical energy storage device may be further based on an indication in the user profile that the user prefers to be offered a choice for a higher performance portable electrical energy storage device than other available vehicle batteries for a premium price at a time of the request. The at least one processor may prompt the user with a choice for the portable electrical energy storage device collection, charging and distribution machine to select for the user a higher performance portable electrical energy storage device than other available vehicle batteries; may receive input in response to the prompt; and may perform the portable electrical energy storage device selection according to the input. The selection for the user of the portable electrical energy storage device may include selection of a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine. The performance characteristics may include one or more of: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has explained to date, number or frequency of deep discharges of the portable electrical energy storage device, temperature exposure of the portable electrical energy storage device, a value that represents number or frequency of charge cycles of the portable electrical energy storage device, whether the portable electrical energy storage device has been used by drivers with aggressive driving profiles. The at least one processor may be further configured to determine a driving profile of a driver by receiving information regarding the driving profile based on one or more of: accelerator readings of the driver which correlate to instances of high acceleration, and levels of current draw during a use of the driver of a portable electrical energy storage device. The at least one processor may be further configured to receive a signal indicative that a used portable electrical energy storage device has been received by the portable electrical energy storage device collection, charging and distribution machine from the user before releasing the portable electrical energy storage device.

A non-transitory computer-readable medium may be summarized as a non-transitory computer-readable medium that stores instructions that when executed by at least one computer system cause the at least one computer system to perform: receiving a request for a portable electrical energy storage device from a user at a portable electrical energy storage device collection, charging and distribution machine; automatically selecting a portable electrical energy storage device in the portable electrical energy storage device collection, charging and distribution machine having particular performance characteristics; and controlling automatic releasing of the selected portable electrical energy storage device to the user.

The instructions that when executed by at least one computer system may further cause the at least one computer system to receive a user profile of the user. The automatically selecting may be based on the received user profile.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 7 is a flow diagram showing a low level method of operating the portable electrical energy storage device collection, charging and distribution machine controller of FIG. 2, according to one non-limiting illustrated embodiment, including selecting a portable electrical energy storage device with higher performance characteristics, useful in the method of FIG. 6.

FIG. 8 is a flow diagram showing a low level method of operating the portable electrical energy storage device collection, charging and distribution machine controller of FIG.

Figure 6:
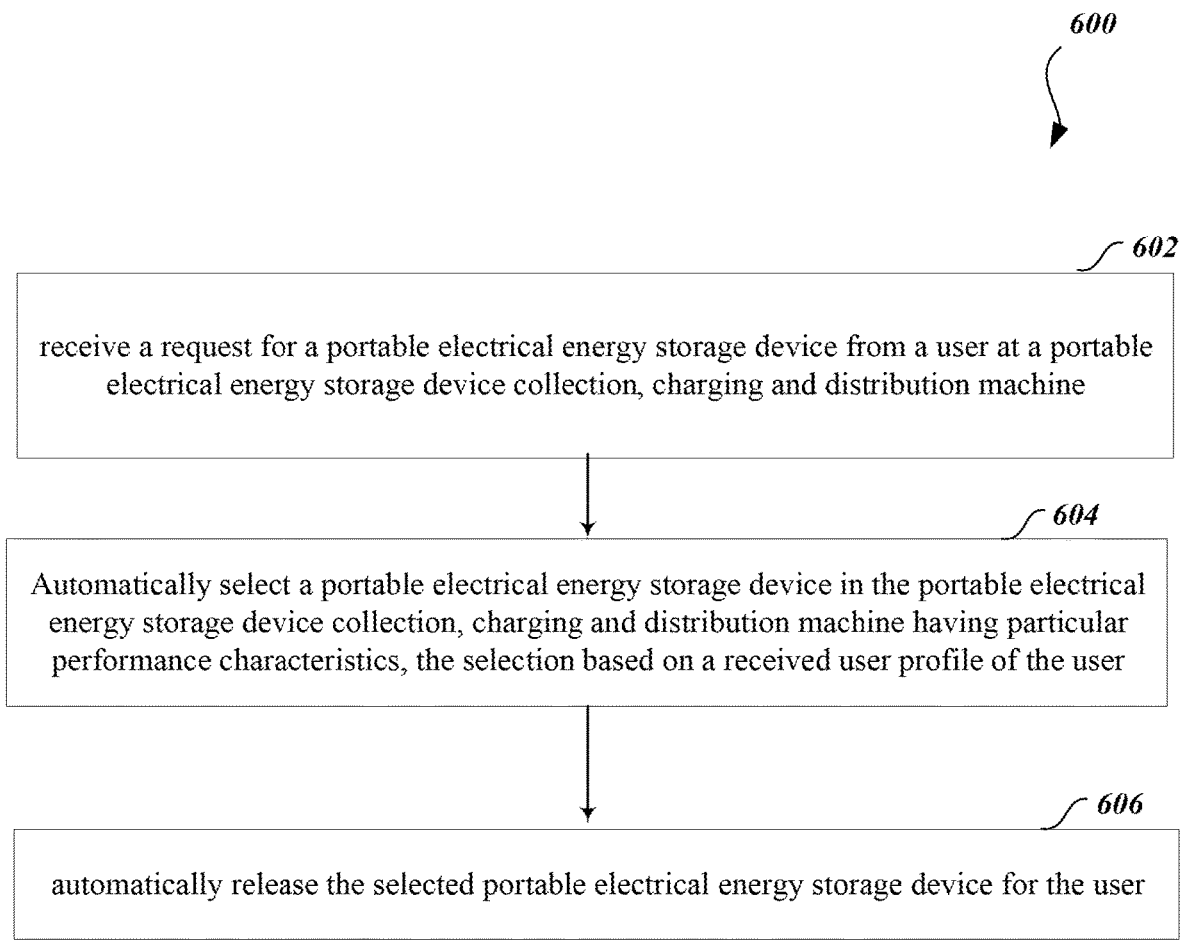
FIG. 6 is a flow diagram showing a high level method of operating a controller of a portable electrical energy storage device collection, charging and distribution machine of FIG. 2, according to one non-limiting illustrated embodiment.

2, according to one non-limiting illustrated embodiment, including determining a driving profile of a driver, useful in the method of FIG. 6.

Figure 2:
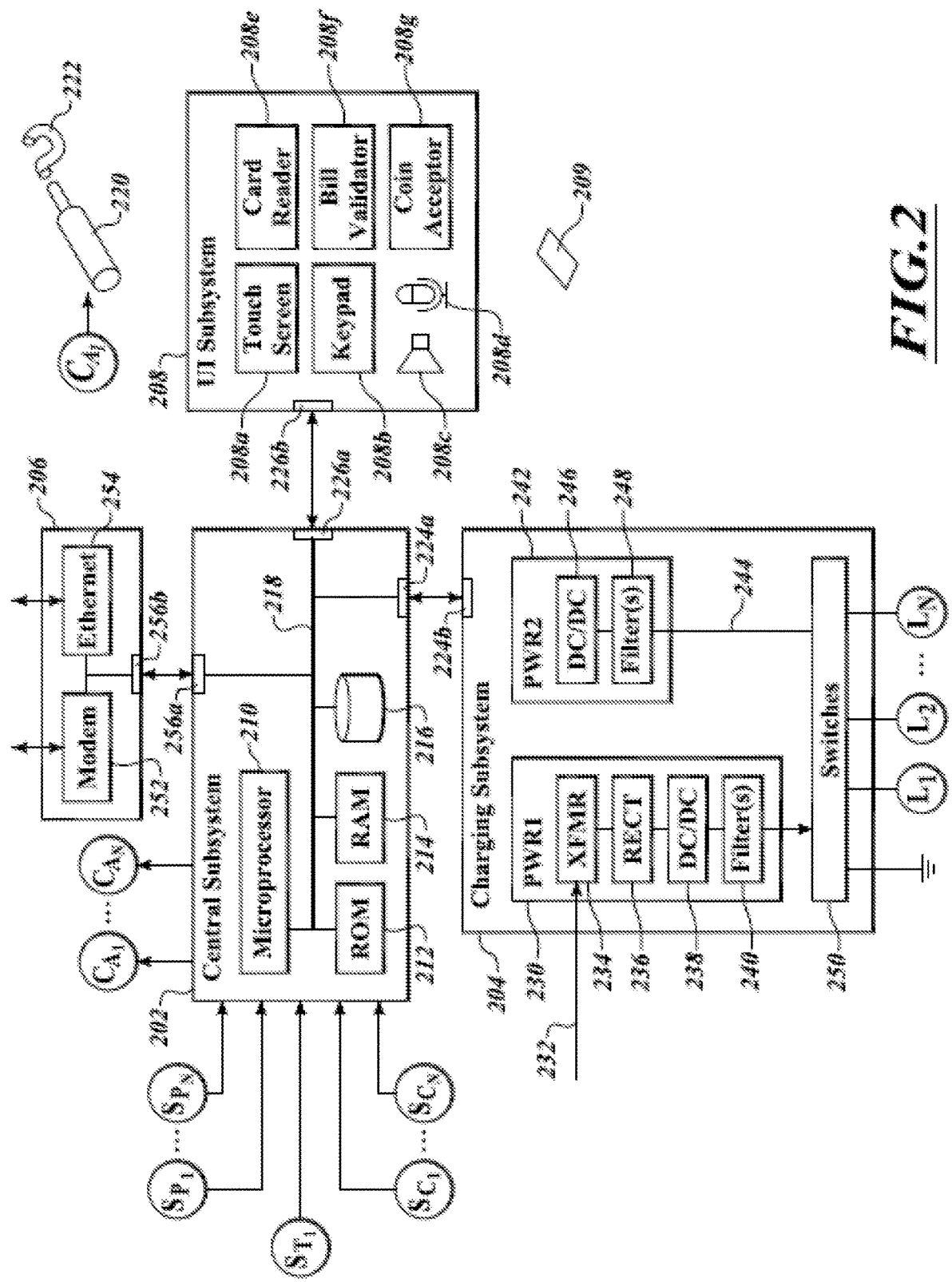
FIG. 2 is a block diagram of the collection, charging and distribution machine of FIG. 1, according to one non-limiting illustrated embodiment.

FIG. 9 is a flow diagram showing a low level method of operating the portable electrical energy storage device collection, charging and distribution machine controller of FIG. 2, according to one non-limiting illustrated embodiment, including a process of releasing the portable electrical energy storage device to the user, useful in the method of FIG. 6.

FIG. 10 is a flow diagram showing a low level method of operating the portable electrical energy storage device collection, charging and distribution machine controller of FIG. 2, according to one non-limiting illustrated embodiment, including configuring a security system of the portable electrical energy storage device, useful in the method of FIG. 6.

Figure 11:
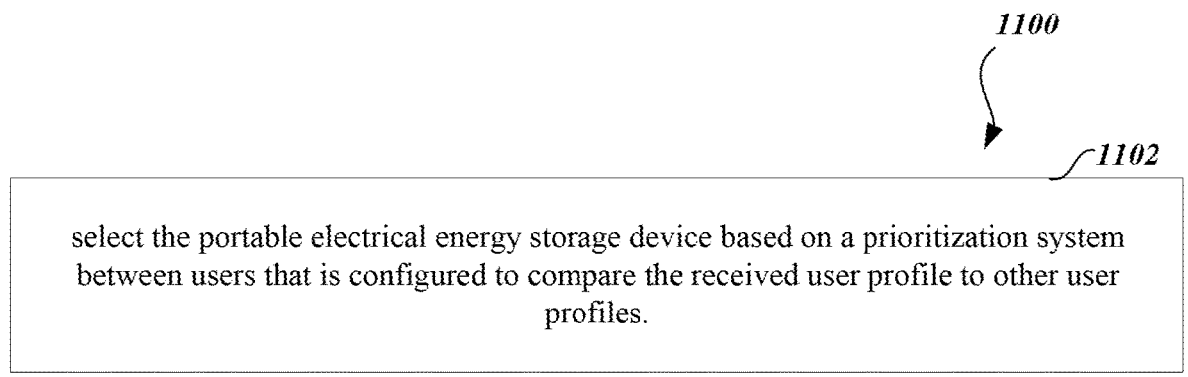

FIG. 11 is a flow diagram showing a low level method of operating the portable electrical energy storage device collection, charging and distribution machine controller of FIG. 2, according to one non-limiting illustrated embodiment, including selecting the portable electrical energy storage device based on a prioritization system, useful in the method of FIG. 6.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
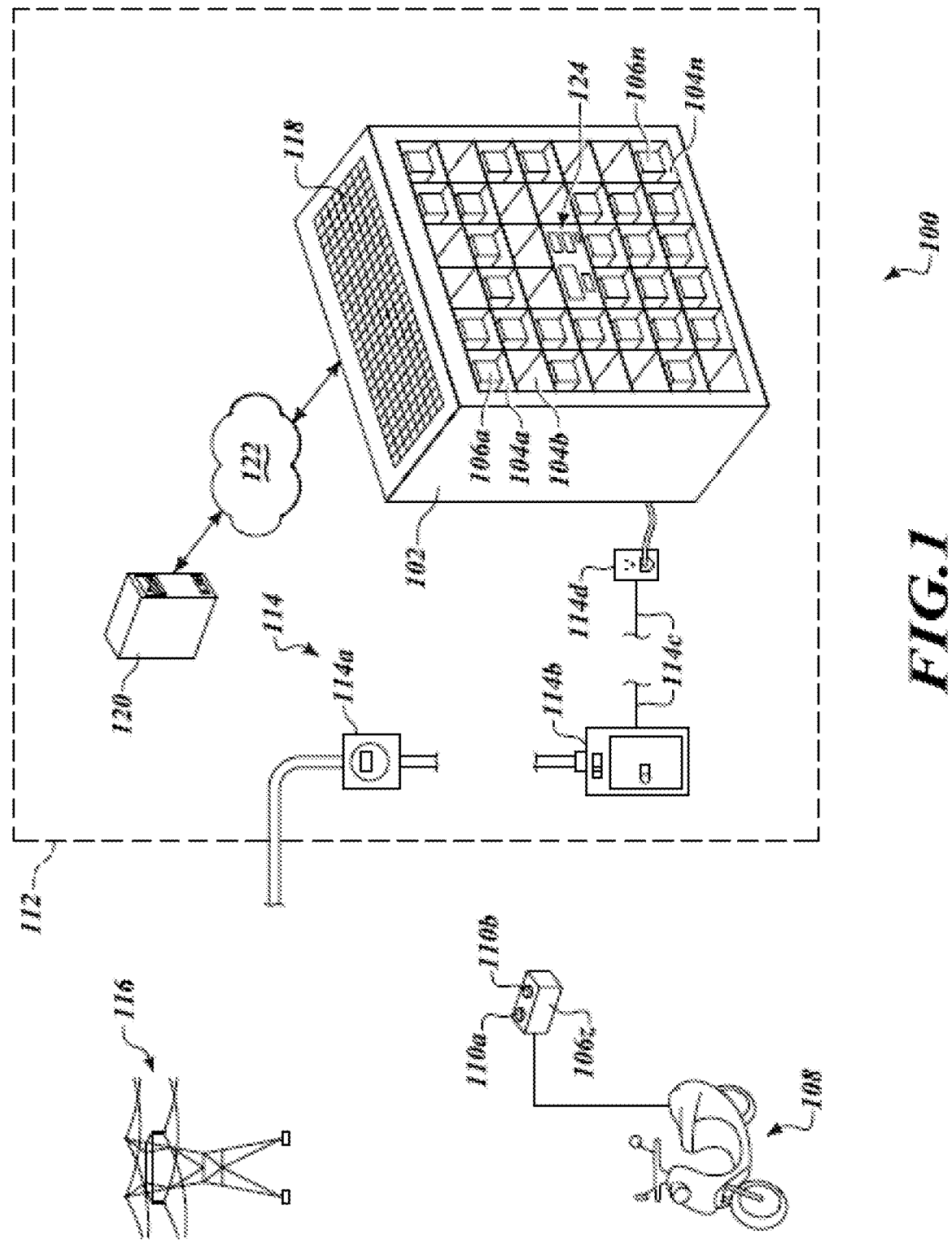
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106 and may include an inventory of portable electrical energy storage devices 106 having various performance characteristics, qualities and other features for selection by users or for automatic selection based on user preferences or profiles.

The portable electrical energy storage devices 106 may take a variety of forms, for example batteries (e.g., array of battery cells) or supercapacitors or ultracapacitors (e.g., array of ultracapacitor cells) and may have various different performance levels and characteristics. For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing. As the portable electrical energy storage devices 106 may be lent, leased, and/or rented out to the public, it is desirable to control how and in what circumstances the portable electrical energy storage devices 106 may be charged and/or release energy, even while outside the collection, charging and distribution machine 102 or otherwise in the possession of users. This control of the portable electrical energy storage devices 106 helps to prevent theft and/or misuse and also enables control of various performance levels of various portable electrical energy storage devices 106. These performance levels may be based on preferences of a user, a subscription level of the user, or other aspects of a user profile. Systems and methods for charging the portable electrical energy storage devices 106, including a security system for controlling such charging and energy release according to user profiles and preferences, are described in more detail below with reference to FIGS. 2-7, and are useful in the overall system for collection, charging and distribution of portable electrical energy storage devices 106 described herein.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, select and distribute portable energy storage devices. Specific operation of the collection, charging and distribution machine 102 is described herein and also below with reference to various flow diagrams (FIGS. 6-11).

The controller 210 may use RAM 214 in a conventional fashion, for volatile storage of instructions, data, etc. The controller 210 may use data store 216 to log or retain information, for example, user profiles, telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs), metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114

(FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1) and/or various components of the portable electrical power storage devices 106. The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the portable electrical energy storage devices 106. For example, the portable electrical energy storage devices 106 stored within the collection, charging and distribution machine may have particular performance characteristics, model information, storage capacity information, use history, etc. that may be acquired by the collection, charging and distribution machine via communications subsystem 206 from the portable electrical energy storage device. Also, such information may be collected via a sensor or other medium that connects to the portable electrical energy storage device stored within the collection, charging and distribution machine. Also, under direction of the control subsystem 202, the collection, charging and distribution machine may provide instructions to or otherwise program an portable electrical energy storage device stored within the collection, charging and distribution machine to perform at particular levels (e.g., release energy at particular levels) according to user preferences, a user profile or other factors.

The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information (e.g., a user profile and/or authentication credentials) from a variety of card media 209, for instance credit cards, debit cards, gift cards, prepaid cards, as well as identification media such as drivers licenses. The card reader 208e may also be able to read information encoded in a non-transitory medium carried by the portable electrical energy storage devices 106, and may also include RFID transponders, transceivers, NFC chips and/or other communication devices to communicate information to the portable electrical energy storage devices 106 (e.g., for authentication of the portable electrical energy storage devices 106 and/or authentication of the collection, charging and distribution machine 102 to the portable electrical energy storage devices 106).

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3:
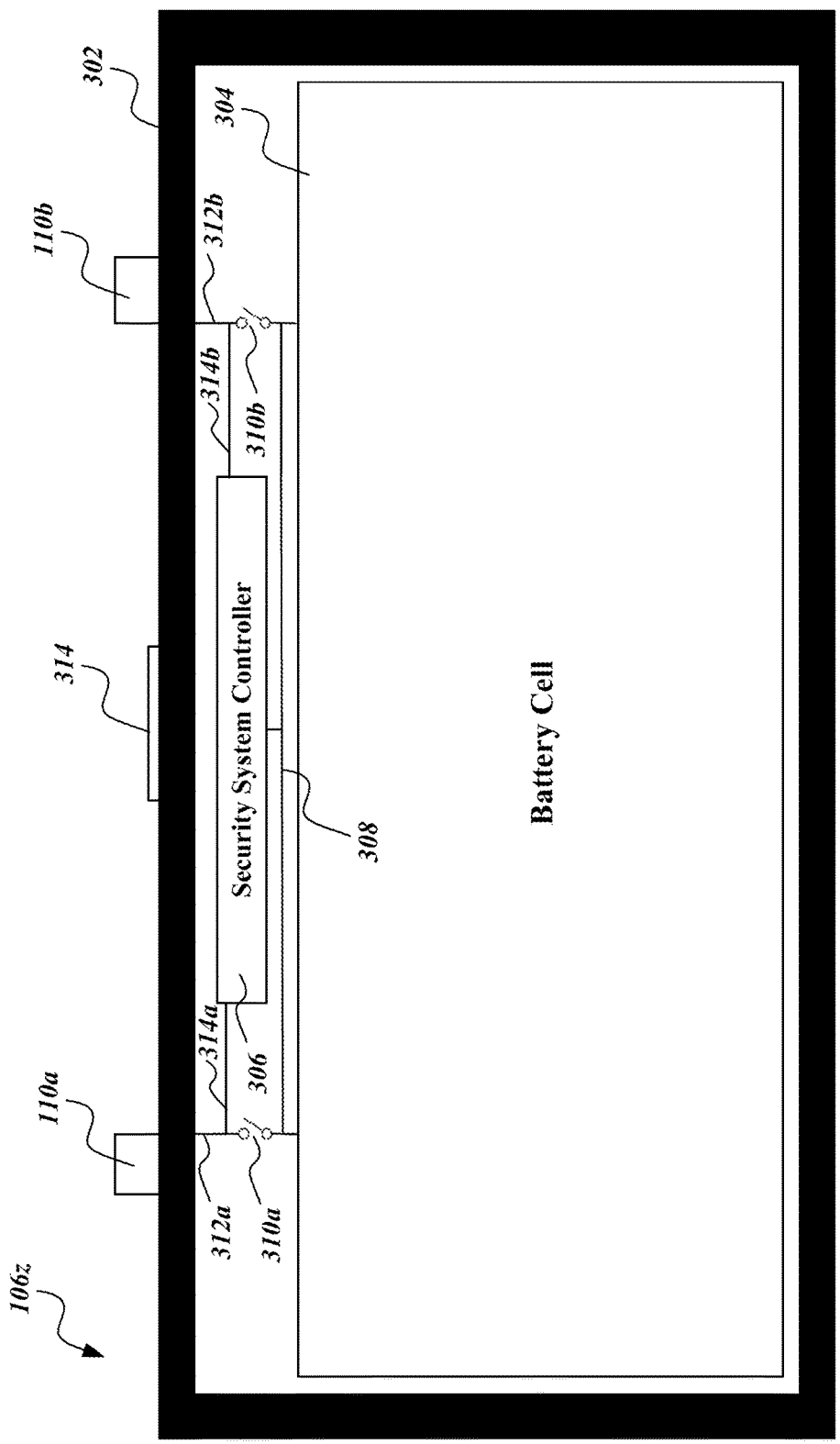
FIG. 3 is a block diagram of the portable electrical energy storage device of FIG. 1, according to one non-limiting illustrated embodiment.

FIG. 3 is a block diagram of the portable electrical energy storage device 106z of FIG. 1, according to one non-limiting illustrated embodiment.

Shown is a portable electrical energy storage device housing 302, electrical terminals 110a, 110b, a battery cell 304, security system controller 306, and a secure access panel 314. The battery cell 304 is any rechargeable type of electrochemical cell that converts stored chemical energy into electrical energy. As described above, the electrical terminals 110a, 110b are accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same through conductive terminal connections 312a and 312b to the battery cell 304. While illustrated in FIG. 3 as posts, the electrical terminals 110a and 110b may take any other form which is accessible from an exterior of the portable electrical energy storage device 106z, including electrical terminals positioned within slots in the battery housing 302.

Operably coupled to terminal lines 312a and 312b and the security system controller 308 are two switches 310a and 310b electronically controlled by the security system controller 306. In a closed position, the switches 310a and 310b operate to complete a circuit allowing electrical current to flow from or be delivered to the portable electrical energy storage device 106z. In an open position, the switches 310a and 310b operate to break the circuit, preventing electrical current from flowing from and preventing electrical current from being delivered to the portable electrical energy storage device 106z. In some embodiments, the switches 310a and 310b may be any type of electronic or electromechanical switch responsive to signals received from the security system controller 308. The switches 310a and 310b may include various electrical and/or electronic components including various types of actuators, contacts, relays, rectifiers, power transistors, IGBTs, and/or MOSFETs, etc.

In some embodiments, by default the portable electric storage device 106z is in a state where it cannot accept a charge unless the portable electric storage device 106z receives authentication from the charging device or other external device (e.g., via a wireless signal). For example, such authentication may be made based on information received via components enabling short range (e.g., via Bluetooth, near field communication (NFC), radio frequency identification (RFID) components and protocols) or longer range wireless communications (e.g., over a wireless LAN, satellite, or cellular network) with various other devices external to the portable electric storage device 106z. The information received on which the authentication may be based may include, but is not limited to, one or more of a code, a password, electronic credentials, electronic security certificate, encrypted data, encryption key, electronic key, etc.

The security system controller 306 is configured to send a signal to open or close the switches 310a and 310b based on an authentication from an external device to which the portable electric storage device 106z is to be connected to receive a charge or to deliver energy. The portable electric storage device security system controller 306 is also configured to regulate the amount of energy to release from the portable electric storage device 106z (e.g., based on a user profile), if any, when both switches 310a and 310b are in the open position, via regulating current flowing through the portable electric storage device security system controller 306 on lines 314a and 314b coupled to the terminals 110a and 110b and the portable electric storage device security system controller 306, and line 308 coupled to the portable electric storage device security system controller 306 and the battery cell 304. The regulation of the energy release from the portable electric storage device 106z may be in response to various information or other wireless signals from devices external to the portable electric storage device 106z. For example, in some instances, a user may select a desired power or performance level of the portable electric storage device 106z at the point of purchase, rent or exchange at the collection, charging and distribution machine 102, and paying a premium for doing so. Also, the amount of energy released may depend on one or more of the following as indicated by information received by the portable electric storage device security system controller 306: a user profile, a vehicle profile of a user, the subscription level of the user, particular promotions being offered related to the identified user or to general users, demographic information of the user such as (income level, gender, age, net worth, marital status, etc.).

The housing 302 is constructed of a polymer or other durable material of sufficient thickness to protect the battery cell 304 and portable electric storage device security system controller 306 from outside elements and tampering. For example the walls of the housing may be at least approximately 0.25 inch thick and completely surround the battery cell 304 and portable electric storage device security system controller 306 (except for in some embodiments a small vent hole in the housing) such that the battery cell 304 and portable electric storage device security system controller 306 cannot be accessed without a key or other specialized tool to open a locked access panel 314.

In some embodiments, some or all of the components of the portable electric storage device security system controller 306 may be located outside of the portable electric storage device 106z as a separate device that actuates the switches 310a and 310b (e.g., via a wireless control signal). Also additional or fewer switches may be used sufficient to prevent or allow the flow of current to and from the battery cell 304.

Figure 4:
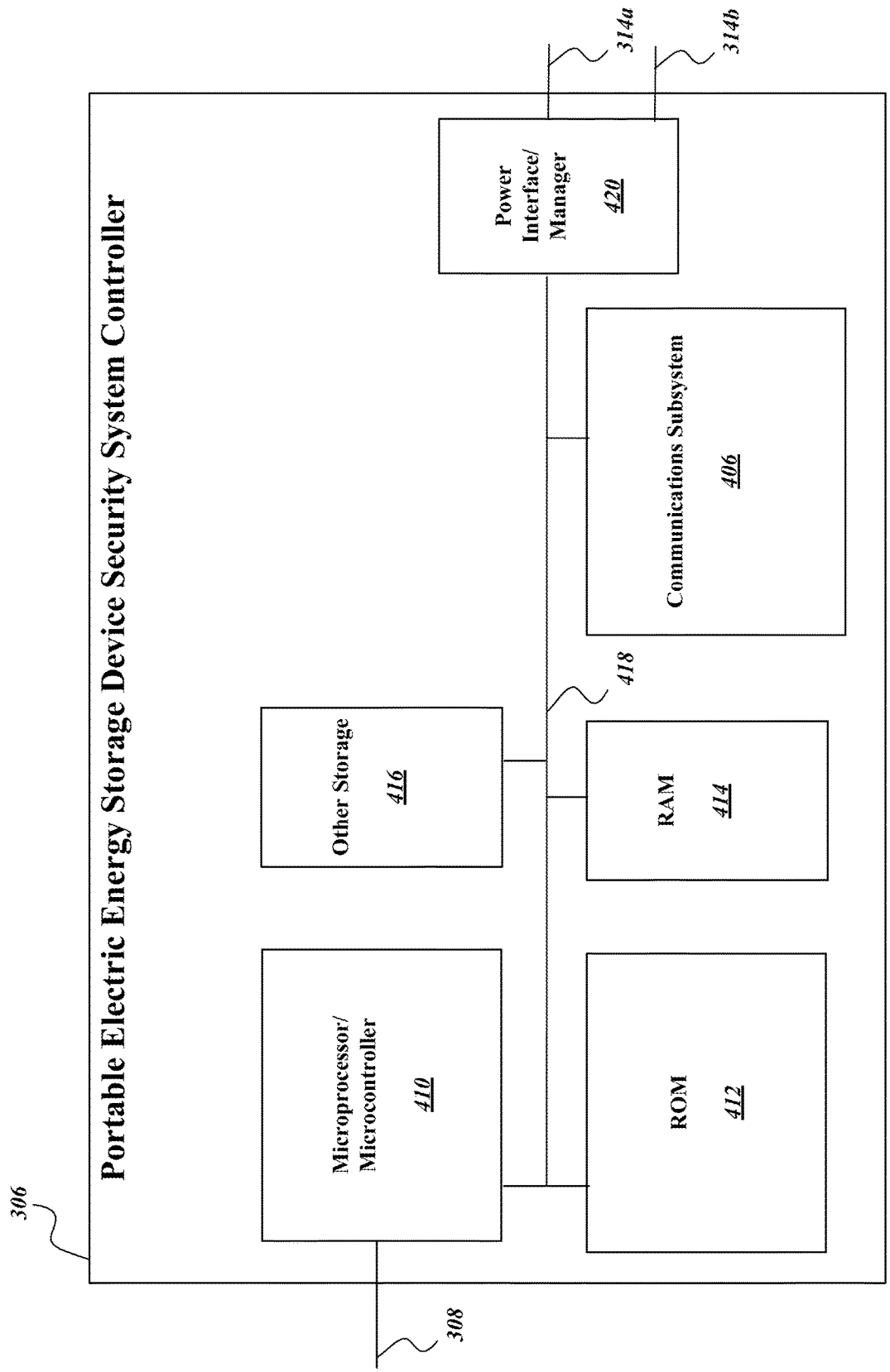
FIG. 4 is a schematic view of the portable electrical energy storage device security system controller of FIG. 3, according to one non-limiting illustrated embodiment.

FIG. 4 is a schematic view of the portable electrical energy storage device security system controller 306 of FIG. 1 and FIG. 3, according to one non-limiting illustrated embodiment.

The portable electric storage device security system controller 306 includes a controller 410, a communications subsystem 406, and a power interface/manager.

The controller 410, for example is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The portable electric storage device security system controller 306 may also include one or more non-transitory processor- or computer-readable storage media, for example read only memory (ROM) 412, random access memory (RAM) 414, and other storage 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The portable electric storage device security system controller 306 may include one or more buses 418 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the portable electric storage device security system controller 306 to generate control signals to allow or prevent the portable electric storage device 106z from accepting a charge or releasing energy, or otherwise regulate the release of energy from the portable electric storage device 106z.

The controller 410 may use RAM 414 in a conventional fashion, for volatile storage of instructions, data, etc. The controller 410 may use data store 416 to log or retain information, for example, information regarding user profile information, vehicle profile information, security codes, credentials, security certificates, passwords, the subscription level of users, particular promotions being offered related to the identified user or to general users, demographic information of users such as (income level, gender, age, net worth, marital status, etc.), information regarding user vehicle locations and telematic and/or telemetric user vehicle information, information regarding portable electrical energy storage device charge capacity, information regarding driving routes of users, etc. The instructions are executable by the controller 410 to control operation of the portable electric storage device security system controller 306 in response to input from remote systems such as those of external devices including but not limited to: charging devices, vehicles, user identification devices (cards, electronic keys, etc.) vehicles, collection, charging and distribution machines, collection, charging and distribution machine service systems, user mobile devices, user vehicles, and end user or operator input, and using data or values for the variables or parameters.

The controller 410 may also receive signals from various sensors and/or components of an external device, such as the communications subsystem 206 of collection, charging and distribution machine 102. This information may include information such as user profile or preference information or other information that characterizes or is indicative of the authenticity, authorization level, operation, status, or condition of such components.

The communications subsystem 406 may include one or more communications modules or components which facilities communications with the various components of external devices and also the various components of the collection, charging and distribution machine 102 of FIG. 1 (e.g., such as to receive software updates or data updates of user profile, vehicle profile and/or promotional campaign information) and one or more user mobile communication devices, such that data may be exchanged between the devices for authentication purposes. The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems 452 or one or more Ethernet or other types of communications cards or components 454 for doing so. The remote communications subsystem 406 may include one or more bridges or routers suitable to handle network traffic including switched packet type communications protocols (TCP/IP), Ethernet or other networking protocols.

In some embodiments, some or all of the components of the portable electric storage device security system controller 306 may be located outside of the portable electric storage device 106z as a separate device that actuates the switches 310a and 310b of the portable electric storage device 106z (e.g., via a wireless control signal) sent via the communications subsystem 406.

The power Interface/manager 420 is controllable by the controller 410 and is configured to provide power to the portable electric storage device security system controller 306 from either the battery cell 304 or external device. Also, the power Interface/manager 420 is configured to regulate the release of power from the portable electric storage device 106z according to control signals received from the controller 410 (e.g., based on received user profile or preference information) and includes various components operable for doing so such as electrical transformers, converters, rectifiers, etc.

Figure 5:
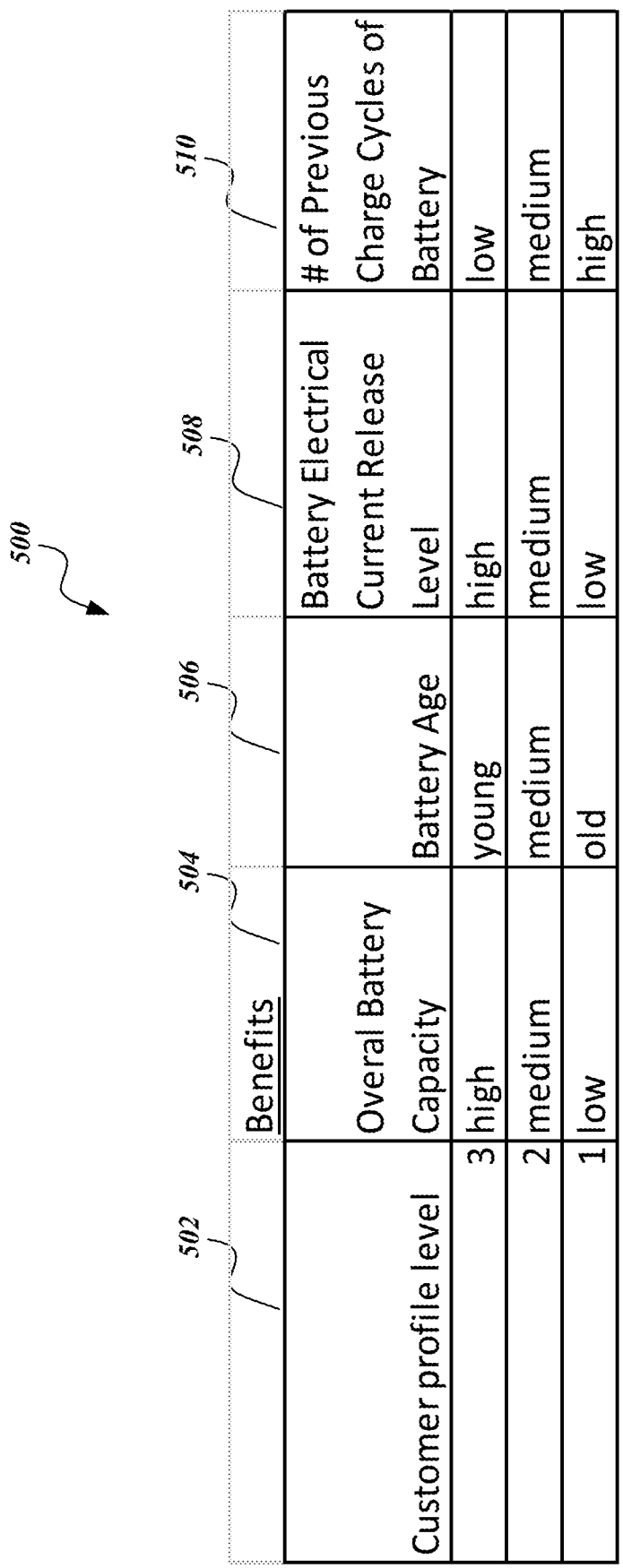
FIG. 5 is a chart showing an example of a mapping of customer profiles to particular portable electrical energy storage device options, according to one non-limiting illustrated embodiment.

FIG. 5 shows a chart 500 showing an example of a mapping of customer profiles to particular portable electrical energy storage device (e.g., battery) options, according to one non-limiting illustrated embodiment.

Such a mapping may be stored within the collection, charging and distribution machine, be communicated to the collection, charging and distribution machine via a backend system, be stored on the portable electrical energy storage device, or otherwise communicated to the portable electrical energy storage device. Shown is a column 502 indicating example customer profile levels. For each customer profile level, there is an overall battery capacity column 504 which indicates the capacity of the battery a customer of that particular profile level will receive. For each customer profile level, there is also a battery age column 506 which indicates the age of the battery a customer of that particular profile level will receive. For each customer profile level, there is also a battery electrical current release column 508 which indicates the electrical current release of the battery a customer of that particular profile level will receive. In addition, for each customer profile level, there is also a number of previous charge cycles column 508 which indicates the number of previous charge cycles of the battery a customer of that particular profile level will receive. Note that customers of higher profile levels receive premium batteries. However, at the point of receiving the battery, the customer may upgrade their profile or pay a one-time upgrade fee for a higher performance or premium battery (e.g., newer batteries, for instance those which are chronologically newer and/or those which have been subjected to fewer recharge cycles; higher performance chemistry; batteries which have been subjected to less extreme discharging rates and/or depths of discharge; batteries which have been subjected to less extreme charging rates and/or subjected to less extreme environmental conditions measured for instance as a total number of exposures to excessive temperatures and/or a total or accumulated time of exposure to excessive temperatures, for instance relative to other batteries or to some defined conditions or thresholds; batteries with higher electrical energy storage capacity; compared to other batteries; batteries with a higher a current charge level compared to other batteries; batteries with a higher percentage of charge level to a charge capacity of the battery compared to other batteries).

Thus, various examples of performance characteristics of portable electrical energy storage devices that differentiate batteries (e.g., premium batteries from other batteries) that the customer may receive include, but are not limited to: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has experienced to date, number or frequency of deep discharges of the portable electrical energy storage device, temperature exposure of the portable electrical energy storage device, a value that represents number or frequency of charge cycles of the portable electrical energy storage device, and whether the portable electrical energy storage device has been used by drivers with aggressive driving profiles. The driving profile of a driver may be determined by the collection, charging and distribution machine and/or the back end or back office system 120 by receiving information regarding items such as accelerator readings of the driver which correlate to instances of high acceleration and recorded levels of current draw while the driver is using the portable electrical energy storage device.

Also, customers of higher profiles may receive access to premium collection, charging and distribution machines or collection, charging and distribution machines in premium locations, or access to a "VIP" line at the collection, charging and distribution machine, etc.

FIG. 6 shows a high level method 600 of operating a controller 210 of a portable electrical energy storage device collection, charging and distribution machine of FIG. 2, according to one non-limiting illustrated embodiment.

At 602, the portable electrical energy storage device collection, charging and distribution machine controller 210 receives a request for a portable electrical energy storage device from a user at a portable electrical energy storage device collection, charging and distribution machine.

At 604, the portable electrical energy storage device collection, charging and distribution machine controller 210 automatically selects a portable electrical energy storage device in the portable electrical energy storage device collection, charging and distribution machine having particular performance characteristics, the selection based on a received user profile of the user (e.g., vehicle operator or driver). The automatic selection of the portable electrical energy storage device may, in some embodiments, include selecting the portable electrical energy storage device based on past route information indicative of a number of aspects of a number of past routes taken by the user as indicated on the user profile. For example, if the user has previously taken long routes on which there were very few or no collection, charging and distribution machines, the portable electrical energy storage device collection, charging and distribution machine controller 210 may select a fully charged portable electrical energy storage device with a higher electrical energy storage capacity (as compared to other available portable electrical energy storage devices) to provide a long range for the user. In some embodiments, the automatic selection of the portable electrical energy storage device may also include selecting the portable electrical energy storage device based on one or more vehicle specifications as indicated on the user profile. For example, the portable electrical energy storage device collection, charging and distribution machine controller 210 may select a portable electrical energy storage device with a higher electrical energy storage capacity or higher energy release level (as compared to other available portable electrical energy storage devices) for users with vehicles having a larger motors or otherwise having higher energy requirements.

At 606, the portable electrical energy storage device collection, charging and distribution machine controller 210 automatically releases the selected portable electrical energy storage device for the user.

FIG. 7 shows a low level method 700 of operating the portable electrical energy storage device collection, charging and distribution machine controller 210 of FIG. 2, according to one non-limiting illustrated embodiment, including selecting a portable electrical energy storage device with higher performance characteristics, useful in the method of FIG. 6.

At 702, the portable electrical energy storage device collection, charging and distribution machine controller 210 selects a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine.

FIG. 8 shows a low level method 800 of operating the portable electrical energy storage device collection, charging and distribution machine controller of FIG. 2, according to one non-limiting illustrated embodiment, including determining a driving profile of a driver, useful in the method of FIG. 6.

At 802, the portable electrical energy storage device collection, charging and distribution machine controller 210 determines a driving profile of a driver by receiving information regarding the driving profile based on one or more of: accelerator readings of the driver which correlate to instances of high acceleration, and levels of current draw during a use of the driver of a portable electrical energy storage device.

FIG. 9 shows a low level method 900 of operating the portable electrical energy storage device collection, charging and distribution machine controller of FIG. 2, according to one non-limiting illustrated embodiment, including a process of releasing the portable electrical energy storage device to the user, useful in the method of FIG. 6.

At 902, the portable electrical energy storage device collection, charging and distribution machine controller 210 receives a signal indicative that a used portable electrical energy storage device has been received by the portable electrical energy storage device collection, charging and distribution machine from the user before releasing the portable electrical energy storage device.

FIG. 10 shows a low level method 1000 of operating the portable electrical energy storage device collection, charging and distribution machine controller of FIG. 2, according to one non-limiting illustrated embodiment, including configuring a security system of the portable electrical energy storage device, useful in the method of FIG. 6.

At 1002, the portable electrical energy storage device collection, charging and distribution machine controller 210 determines, based on the received user profile, a particular level of energy to release from the portable electrical energy storage device for use by the user.

At 1004, the portable electrical energy storage device collection, charging and distribution machine controller 210 configures a security system of the portable electrical energy storage device to release energy from the portable electrical energy storage device at the determined particular level for use by the user based on the received user profile.

FIG. 11 shows a low level method 1100 of operating the portable electrical energy storage device collection, charging and distribution machine controller of FIG. 2, according to one non-limiting illustrated embodiment, including selecting the portable electrical energy storage device based on a prioritization system, useful in the method of FIG. 6.

At 1102, the portable electrical energy storage device collection, charging and distribution machine controller 210 selects the portable electrical energy storage device based on a prioritization system between users that is configured to compare the received user profile to other user profiles.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES," and filed Jul. 26, 2011, U.S. provisional patent application Ser. No. 61/647,936, entitled "APPARATUS, METHOD AND ARTICLE FOR COLLECTION, CHARGING AND DISTRIBUTING POWER STORAGE DEVICES, SUCH AS BATTERIES," and filed May 16, 2012, U.S. provisional patent application Ser. No. 61/534,753, entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES," and filed Sep. 14, 2011, U.S. provisional patent application Ser. No. 61/534,761, entitled "APPARATUS, METHOD AND ARTICLE FOR AUTHENTICATION, SECURITY AND CONTROL OF POWER STORAGE DEVICES SUCH AS BATTERIES," and filed Sep. 14, 2011, U.S. provisional patent application Ser. No. 61/534,772, entitled "APPARATUS, METHOD AND ARTICLE FOR AUTHENTICATION, SECURITY AND CONTROL OF POWER STORAGE DEVICES, SUCH AS BATTERIES, BASED ON USER PROFILES," and filed Sep. 14, 2011, U.S. provisional patent application Ser. No. 61/511,887, entitled "THERMAL MANAGEMENT OF COMPONENTS IN ELECTRIC MOTOR DRIVE VEHICLES" and filed Jul. 26, 2011, U.S. provisional patent application Ser. No. 61/647,941, entitled "THERMAL MANAGEMENT OF COMPONENTS IN ELECTRIC MOTOR DRIVE VEHICLES," and filed May 16, 2012, U.S. provisional patent application Ser. No.

61/511,880, entitled "DYNAMICALLY LIMITING VEHICLE OPERATION FOR BEST EFFORT ECONOMY," and filed Jul. 26, 2011, U.S. provisional patent application Ser. No. 61/557,170, entitled "APPARATUS, METHOD, AND ARTICLE FOR PHYSICAL SECURITY OF POWER STORAGE DEVICES IN VEHICLES," and filed Nov. 8, 2011, U.S. provisional patent application Ser. No. 61/581,566, entitled "APPARATUS, METHOD AND ARTICLE FOR A POWER STORAGE DEVICE COMPARTMENT," and filed Dec. 29, 2011, U.S. provisional patent application Ser. No. 61/601,404, entitled "APPARATUS, "METHOD AND ARTICLE FOR PROVIDING VEHICLE DIAGNOSTIC DATA," and filed Feb. 21, 2012, U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES," and filed Feb. 22, 2012, and U.S. provisional patent application Ser. No. 61/601,953, entitled "APPARATUS, METHOD AND ARTICLE FOR PROVIDING INFORMATION REGARDING AVAILABILITY OF POWER STORAGE DEVICES ATA POWER STORAGE DEVICE COLLECTION, CHARGING AND DISTRIBUTION MACHINE," and filed Feb. 22, 2012, U.S. application Ser. No. 13/559,314 filed on Jul. 26, 2012, now issued as U.S. Pat. No. 9,129,461, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES,", U.S. application Ser. No. 13/559,264 filed on Jul. 26, 2012, now issued as U.S. Pat. No. 9,437,058, naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,054 filed on Jul. 26, 2012, now issued as U.S. Pat. No. 8,560,147, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES," U.S. application Ser. No. 13/559,390 filed on Jul. 26, 2012, now issued as U.S. Pat. No. 8,996,212 naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA,", U.S. application Ser. No. 13/559,343 filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE,", and U.S. application Ser. No. 13/559,333 filed on Jul. 26, 2012 now issued as U.S. Pat. No. 8,862,388, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES," are incorporated herein by reference in their entireties. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a machine, comprising:
receiving, by a controller of the machine, a request for a portable electrical energy storage device at the machine;
determining, by the controller of the machine, a user profile associated with the request;
selecting, by the controller of the machine, at least one portable electrical energy storage device having a particular performance characteristic based on the user profile;
configuring, by the controller of the machine, a security system of the selected at least one portable electrical energy storage device to regulate the selected at least one portable electrical energy storage device to release energy at a particular level; and
determining, by the controller of the machine, the particular level of energy to release from the selected at least one portable electrical energy storage device based on the user profile.

2. The method of claim 1, wherein the particular level of energy to release from the selected at least one portable electrical energy storage device is determined based on a user subscription plan associated with the user profile.

3. The method of claim 1, wherein the particular level of energy to release from the selected at least one portable electrical energy storage device is determined based on information regarding a vehicle location associated with the user profile.

4. The method of claim 1, wherein the particular level of energy to release from the selected at least one portable electrical energy storage device is determined based on information regarding a driving route associated with the user profile.

5. The method of claim 4, wherein the driving route includes a past route, and wherein the method further comprises:
determining, by the controller of the machine, the particular level of energy to release at least partially based on the past route.

6. The method of claim 1, further comprising:
selecting, by the controller of the machine, the at least one portable electrical energy storage device at least partially based on a vehicle specification associated with the user profile.

7. The method of claim 6, wherein the vehicle specification is indicative of a vehicle energy requirement, and wherein the at least one portable electrical energy storage device is selected based on the vehicle energy requirement.

8. The method of claim 1, further comprising:
instructing, by the controller of the machine, the machine to release the selected at least one portable electrical energy storage device.

9. The method of claim 1, further comprising configuring the security system to send a signal to operate a switch so as to enable the selected at least one portable electrical energy storage device to release energy.

10. The method of claim 1, further comprising configuring the security system to send a signal to operate a switch so as to enable the selected at least one portable electrical energy storage device to be charged.

11. The method of claim 1, further comprising configuring the security system to send a signal to operate a switch in response to a result of an authentication from an external device.

12. The method of claim 11, wherein the external device is the machine or a vehicle.

13. A method of operating a machine, comprising:
receiving, by a controller of the machine, a request for a portable electrical energy storage device at the machine;
receiving, by the controller of the machine from a back-end system, a user profile associated with the request;
selecting, by the controller of the machine, at least one portable electrical energy storage device based on the user profile;
configuring, by the controller of the machine, a security system of the selected at least one portable electrical energy storage device to regulate the selected at least one portable electrical energy storage device to release energy at a particular level; and
determining, by the controller of the machine, the particular level of energy to release from the selected at least one portable electrical energy storage device based on the user profile.

14. The method of claim 13, wherein the particular level of energy to release from the selected at least one portable electrical energy storage device is determined based on a user subscription plan associated with the user profile, information regarding a vehicle location associated with the user profile, and information regarding a driving route associated with the user profile.

15. The method of claim 14, wherein the driving route includes a past route, and wherein the method further comprises:
determining, by the controller of the machine, the particular level of energy to release at least partially based on the past route.

16. The method of claim 13, further comprising:
selecting, by the controller of the machine, the at least one portable electrical energy storage device at least partially based on a vehicle specification associated with the user profile.

17. The method of claim 16, wherein the vehicle specification is indicative of a vehicle energy requirement, and wherein the at least one portable electrical energy storage device is selected based on the vehicle energy requirement.

18. The method of claim 13, further comprising:
instructing the machine, by the controller of the machine, to release the selected at least one portable electrical energy storage device.

19. The method of claim 13, wherein the particular level of energy to release from the selected at least one portable electrical energy storage device is determined based on a user subscription plan associated with the user profile.

20. The method of claim 13, wherein the particular level of energy to release from the selected at least one portable electrical energy storage device is determined based on information regarding a driving route associated with the user profile.

21. A machine comprising:
a plurality of receivers configured to removably receive a plurality of portable electrical energy storage devices respectively, wherein each of the portable electrical energy storage devices includes a security system configured to regulate releasing energy; and
a controller coupled to the one or more receivers and configured to receive a request for a portable electrical energy storage device at the machine;
wherein the controller is further configured to:
determine a user profile associated with the request;
select at least one portable electrical energy storage device from the plurality of portable electrical energy storage devices having a particular performance characteristic based on the user profile; and
configure the security system of the selected at least one portable electrical energy storage device to regulate the selected at least one portable electrical energy storage device to release energy at a particular level; and
determine the particular level of energy to release from the selected at least one portable electrical energy storage device based on the user profile.

22. The machine of claim 21, further comprising an array of photovoltaic (PV) cells configured to produce electrical power from solar insolation.

23. The machine of claim 21, further comprising a user interface configured to receive the request for the portable electrical energy storage device at the machine.

24. The machine of claim 21, wherein at least one of the plurality of receivers is configured to hold two or more portable electrical energy storage devices.

25. The machine of claim 21, wherein the controller is configured to determine the particular level of energy to release from the selected at least one portable electrical energy storage device based on a user subscription plan associated with the user profile.

26. The machine of claim 21, wherein the controller is configured to determine the particular level of energy to release from the selected at least one portable electrical energy storage device based on information regarding a vehicle location associated with the user profile.

27. The machine of claim 21, wherein the controller is configured to determine the particular level of energy to release from the selected at least one portable electrical energy storage device based on information regarding a driving route associated with the user profile.

* * * * *